US012732903B2

(12) United States Patent
Majjiga et al.

(10) Patent No.: US 12,732,903 B2
(45) Date of Patent: Sep. 8, 2026

(54) SYSTEMS AND METHODS FOR NETWORK SLICE AND SUBSCRIBER PROFILE MANAGEMENT FOR FLIGHT PATHS ACROSS MULTIPLE NETWORKS

(71) Applicant: Verizon Patent and Licensing Inc., Basking Ridge, NJ (US)

(72) Inventors: Deepak Majjiga, Tirupati West (IN); Sabareeswar P. Balakrishnan, Chennai (IN); Kristen Sydney Young, Mine Hill, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 920 days.

(21) Appl. No.: 18/149,556

(22) Filed: Jan. 3, 2023

(65) Prior Publication Data

US 2024/0205810 A1 Jun. 20, 2024

(30) Foreign Application Priority Data

Dec. 15, 2022 (IN) ............................. 202241072558

(51) Int. Cl.
*H04W 4/40* (2018.01)
*G08G 5/57* (2025.01)
*H04W 8/12* (2009.01)
*H04W 8/20* (2009.01)
*H04W 48/18* (2009.01)

(52) U.S. Cl.
CPC .............. *H04W 48/18* (2013.01); *G08G 5/57* (2025.01); *H04W 4/40* (2018.02); *H04W 8/12* (2013.01); *H04W 8/20* (2013.01)

(58) Field of Classification Search
CPC ....... H04W 48/18; H04W 60/00; H04W 8/12; H04W 8/20; H04W 24/02; H04W 84/042; H04W 60/04; H04W 4/40; G08G 5/55; G08G 5/57; G08G 5/26; G08G 5/22; G08G 5/34; H04B 7/18506
See application file for complete search history.

(56) References Cited

U.S. PATENT DOCUMENTS 11,877,162 B2 * 1/2024 Majjiga ................. H04W 24/02
2017/0083979 A1 * 3/2017 Winn ................... G06Q 20/102
2022/0046528 A1 * 2/2022 Yang ..................... H04W 72/51
2022/0051577 A1 * 2/2022 Ali ........................... G08G 5/56
(Continued)

FOREIGN PATENT DOCUMENTS

EP 4161110 A1 * 4/2023 .............. H04W 4/02

*Primary Examiner* — Marcus Hammonds

(57) ABSTRACT

A system may include a Network Data Analytics Function device configured to receive information relating to a planned flight path of an unmanned aerial vehicle (UAV), wherein the planned flight path crosses areas serviced by a plurality of radio access networks; and generate a plurality of time slot predictions, wherein a time slot prediction specifies a time slot, a network slice, and a subscriber profile identifier. The system may further include an Access and Mobility Function device configured to generate a set of instructions based on the plurality of time slot predictions; and an Application Function device configured to provide the generated set of instructions to the UAV, wherein the instructions cause the UAV to select a particular network slice and a particular subscriber profile during a particular time slot of the flight path.

20 Claims, 11 Drawing Sheets

1000

1001

| TIME SLOT 1010 | LOCATION 1020 | APPLICATION 1030 | NETWORK SLICE 1040 | PLMN ID 1050 | eSIM PROFILE 1060 | NETWORK CHANGE 1070 | ROAMING 1080 |
|---|---|---|---|---|---|---|---|
| SLOT 1 | TAI 1 | PRIVATE FLIGHT MONITORING | PRIVATE mIoT | PLMN 1 | PROFILE 1 | NO | NO |
| SLOT 2 | TAI 2 | PRIVATE FLIGHT MONITORING | PRIVATE mIoT | PLMN 1 | PROFILE 1 | NO | NO |
| SLOT 3 | TAI 4 | FLIGHT MONITORING | mIoT | PLMN 2 | PROFILE 2 | YES | NO |

1002

| TIME SLOT 1010 | LOCATION 1020 | APPLICATION 1030 | NETWORK SLICE 1040 | PLMN ID 1050 | eSIM PROFILE 1060 | NETWORK CHANGE 1070 | ROAMING 1080 |
|---|---|---|---|---|---|---|---|
| SLOT 3 | TAI 4 | FLIGHT MONITORING | mIoT | PLMN 2 | PROFILE 2 | NO | NO |
| SLOT 4 | TAI 5 | COLLISION DETECTION | URLLC | PLMN 2 | PROFILE 2 | NO | NO |
| SLOT 5 | TAI 7 | COLLISION DETECTION | URLLC | PLMN 3 | PROFILE 3 | YES | YES |

1003

| TIME SLOT 1010 | LOCATION 1020 | APPLICATION 1030 | NETWORK SLICE 1040 | PLMN ID 1050 | eSIM PROFILE 1060 | NETWORK CHANGE 1070 | ROAMING 1080 |
|---|---|---|---|---|---|---|---|
| SLOT 5 | TAI 7 | COLLISION DETECTION | URLLC | PLMN 3 | PROFILE 3 | NO | YES |
| SLOT 6 | TAI 11 | PRIVATE FLIGHT MONITORING | mIoT | PLMN 3 | PROFILE 3 | NO | YES |

(56) References Cited

U.S. PATENT DOCUMENTS

| | | | | |
|---|---|---|---|---|
| 2022/0124560 | A1* | 4/2022 | Yeh | H04W 28/18 |
| 2022/0386147 | A1 | 12/2022 | Majjiga et al. | |
| 2023/0337089 | A1* | 10/2023 | Ryu | H04W 36/1443 |
| 2024/0305533 | A1* | 9/2024 | Bai | H04W 24/02 |
| 2025/0176040 | A1* | 5/2025 | Faccin | G08G 5/80 |

* cited by examiner

1000

1001

| TIME SLOT 1010 | LOCATION 1020 | APPLICATION 1030 | NETWORK SLICE 1040 | PLMN ID 1050 | eSIM PROFILE 1060 | NETWORK CHANGE 1070 | ROAMING 1080 |
|---|---|---|---|---|---|---|---|
| SLOT 1 | TAI 1 | PRIVATE FLIGHT MONITORING | PRIVATE mIoT | PLMN 1 | PROFILE 1 | NO | NO |
| SLOT 2 | TAI 2 | PRIVATE FLIGHT MONITORING | PRIVATE mIoT | PLMN 1 | PROFILE 1 | NO | NO |
| SLOT 3 | TAI 4 | FLIGHT MONITORING | mIoT | PLMN 2 | PROFILE 2 | YES | NO |

1002

| TIME SLOT 1010 | LOCATION 1020 | APPLICATION 1030 | NETWORK SLICE 1040 | PLMN ID 1050 | eSIM PROFILE 1060 | NETWORK CHANGE 1070 | ROAMING 1080 |
|---|---|---|---|---|---|---|---|
| SLOT 3 | TAI 4 | FLIGHT MONITORING | mIoT | PLMN 2 | PROFILE 2 | NO | NO |
| SLOT 4 | TAI 5 | COLLISION DETECTION | URLLC | PLMN 2 | PROFILE 2 | NO | NO |
| SLOT 5 | TAI 7 | COLLISION DETECTION | URLLC | PLMN 3 | PROFILE 3 | YES | YES |

1003

| TIME SLOT 1010 | LOCATION 1020 | APPLICATION 1030 | NETWORK SLICE 1040 | PLMN ID 1050 | eSIM PROFILE 1060 | NETWORK CHANGE 1070 | ROAMING 1080 |
|---|---|---|---|---|---|---|---|
| SLOT 5 | TAI 7 | COLLISION DETECTION | URLLC | PLMN 3 | PROFILE 3 | NO | YES |
| SLOT 6 | TAI 11 | PRIVATE FLIGHT MONITORING | mIoT | PLMN 3 | PROFILE 3 | NO | YES |

| TIME SLOT 1110 | LOCATION 1120 | SUBSCRIBED SLICES 1130 | ALLOWED SLICES 1140 | SELECTED SLICE 1150 | SLICE UPDATES 1160 | SLICE CHANGE 1170 | PLMN CHANGE 1180 | ROAMING 1190 | eSIM PROFILE 1195 |
|---|---|---|---|---|---|---|---|---|---|
| SLOT 1 | TAI 1 | S-NSSAI-A1 S-NSSAI-A2 S-NSSAI-A3 | S-NSSAI-A1 S-NSSAI-A2 | S-NSSAI-A2 | | NO | NO | NO | 1 |
| SLOT 2 | TAI 2 | S-NSSAI-A1 S-NSSAI-A2 S-NSSAI-A3 | S-NSSAI-A1 S-NSSAI-A2 | S-NSSAI-A2 | | NO | NO | NO | 1 |
| SLOT 3 | TAI 4 | S-NSSAI-A1 S-NSSAI-A2 S-NSSAI-A3 | S-NSSAI-A1 S-NSSAI-A3 | S-NSSAI-A1 | | YES | YES | NO | 2 |

1102

| TIME SLOT 1110 | LOCATION 1120 | SUBSCRIBED SLICES 1130 | ALLOWED SLICES 1140 | SELECTED SLICE 1150 | SLICE UPDATES 1160 | SLICE CHANGE 1170 | PLMN CHANGE 1180 | ROAMING 1190 | eSIM PROFILE 1195 |
|---|---|---|---|---|---|---|---|---|---|
| SLOT 3 | TAI 4 | S-NSSAI-A1 S-NSSAI-A2 S-NSSAI-A3 | S-NSSAI-A1 S-NSSAI-A3 | S-NSSAI-A1 | | NO | NO | NO | 2 |
| SLOT 4 | TAI 5 | S-NSSAI-A1 S-NSSAI-A2 S-NSSAI-A3 | S-NSSAI-A1 S-NSSAI-A3 | S-NSSAI-A3 | | YES | NO | NO | 2 |
| SLOT 5 | TAI 7 | S-NSSAI-A1 S-NSSAI-A2 S-NSSAI-A3 | S-NSSAI-A1 S-NSSAI-A3 | S-NSSAI-A3 | | NO | YES | YES | 3 |

1103

| TIME SLOT 1110 | LOCATION 1120 | SUBSCRIBED SLICES 1130 | ALLOWED SLICES 1140 | SELECTED SLICE 1150 | SLICE UPDATES 1160 | SLICE CHANGE 1170 | PLMN CHANGE 1180 | ROAMING 1190 | eSIM PROFILE 1195 |
|---|---|---|---|---|---|---|---|---|---|
| SLOT 5 | TAI 7 | S-NSSAI-A1 S-NSSAI-A3 S-NSSAI-A4 | S-NSSAI-A1 S-NSSAI-A3 | S-NSSAI-A3 | | NO | NO | YES | 3 |
| SLOT 6 | TAI 11 | S-NSSAI-A1 S-NSSAI-A3 S-NSSAI-A4 | S-NSSAI-A1 S-NSSAI-A3 | S-NSSAI-A4 | S-NSSAI-A4 | YES | NO | YES | 3 |

FIG. 11

SYSTEMS AND METHODS FOR NETWORK SLICE AND SUBSCRIBER PROFILE MANAGEMENT FOR FLIGHT PATHS ACROSS MULTIPLE NETWORKS

CROSS-REFERENCE TO RELATED APPLICATION

This application claims priority to Indian Provisional Application No. 202241072558, filed Dec. 15, 2022, the disclosure of which is hereby incorporated by reference herein in its entirety.

BACKGROUND INFORMATION

The use of Unmanned Aerial Vehicles (UAVs), also referred to as drones, is increasing. UAVs may be used for aerial surveys, to collect other types of data for an area, to perform surveillance, to deliver packages, and/or perform other types of services. Communication with a UAV may be performed over a cellular wireless network. A UAV may use various communication services provided by a cellular wireless network.

BRIEF DESCRIPTION OF THE DRAWINGS

FIG. 10 illustrates a set of tables associated with NWDAFs of networks associated with a flight path according to an implementation described herein; and FIG. 11 illustrates a set of tables associated with AMFs of networks associated with a flight path according to an implementation described herein.

DETAILED DESCRIPTION OF EMBODIMENTS

Figure 1:
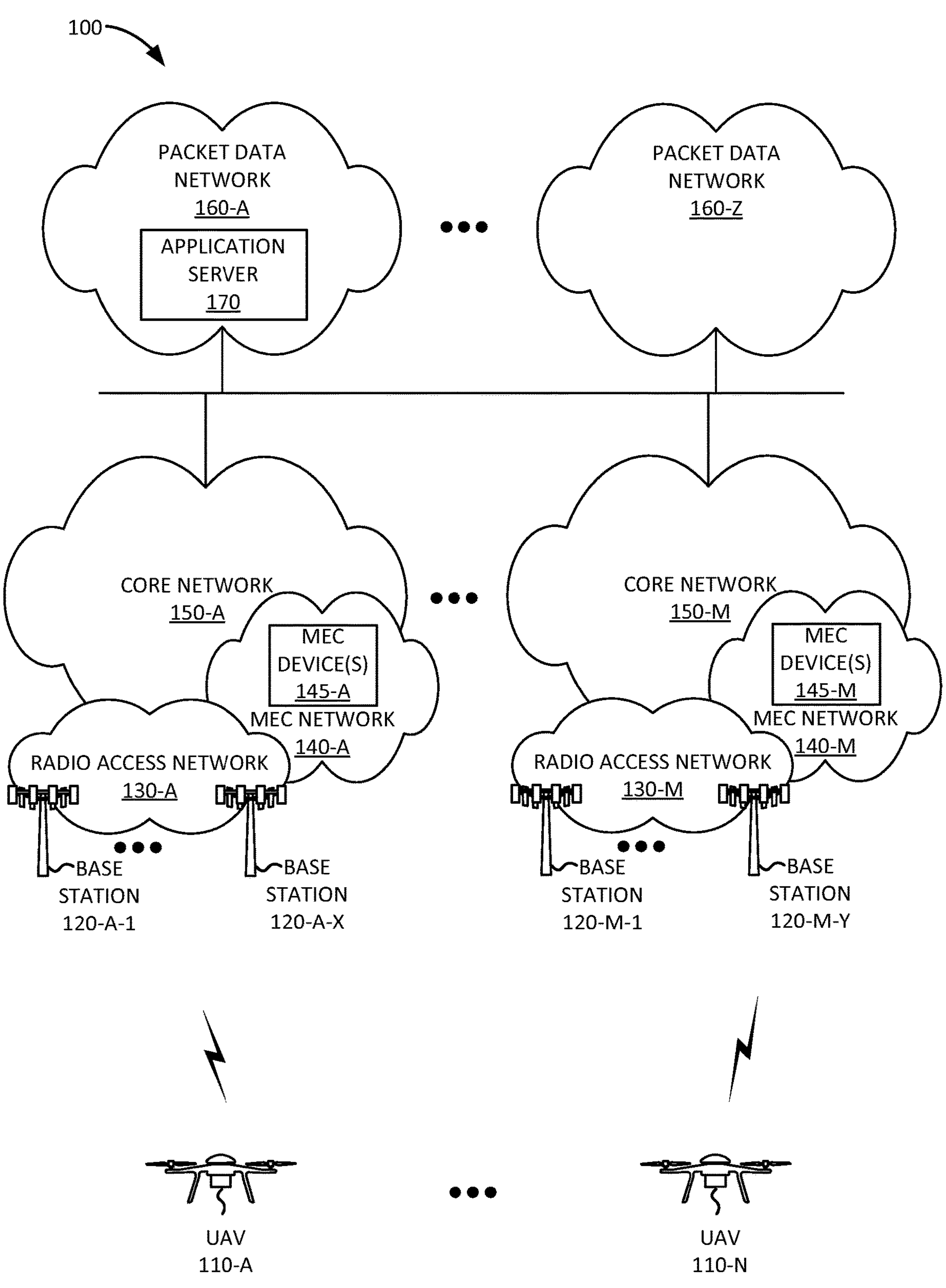
FIG. 1 illustrates an environment according to an implementation described herein.

The following detailed description refers to the accompanying drawings. The same reference numbers in different drawings identify the same or similar elements.

UAVs may use cellular wireless communication to transmit and/or receive data while in flight. For example, a UAV communicates with an application server that interacts with an application running on the UAV. Examples of such applications include a flight monitoring application that transmits the location, speed, and elevation of the UAV; an application that controls pickup and drop-off of a payload carried by the UAV; a camera application that records and transmits images or videos captured by the UAV; an augmented reality (AR) application that overlays text, graphics, or other types of additional information over images or videos captured by the UAV; a sensor application that records and captures other types of data; a navigation application that uses images or video captured by the UAV to aid in navigation; a collision detection application that uses images or video captured by the UAV to avoid collisions with building, ground vehicles, and/or other UAVs; and/or other types of applications. Different types of applications used by the UAV may require different cellular wireless communication services provided by a cellular wireless network.

An important feature of next generation cellular wireless network, such as, for example, a Fifth Generation (5G) network, is network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources. Each network slice may be configured to implement a different set of requirements and/or priorities and/or may be associated with a particular Quality of Service (QoS) class, type of service, security requirement, and/or particular enterprise customer associated with a set of user equipment (UE) devices.

Examples of network slices that may be implemented in a 5G network include a default network slice used for sessions not associated with other particular network slices; an enhanced Mobile Broadband (eMBB) network slice for Voice over Internet Protocol (VoIP) telephone calls and/or data sessions for accessing Internet websites; a massive Internet of Things (mIoT) network slice for Internet of Things (IoT) devices; an Ultra-Reliable Low Latency Communication (URLLC) network slice for URLLC communication, such as medical monitoring devices, autonomous vehicles, industrial automation, etc.; and/or other types of network slices. Furthermore, different applications may be associated with different network slices. For example, a gaming application may be associated with a first network slice, a vehicle to everything (V2X) may be associated with a second network slice, etc. UAVs may use different applications during different portions of a flight path and the different applications may require the use of different network slices.

Furthermore, the use of private 5G networks is also increasing. For example, private entities, such as enterprises in industries such as energy, oil, manufacturing, logistics, or supply chain, or large residential communities, may rely on a 5G private network to provide cellular wireless services for its customers, employees, or residents. A private network may be associated with its own Public Land Mobile Network (PLMN) identifier (ID). The flight path of a UAV may cross areas serviced by a 5G private network and a UAV may need to be able to seamlessly navigate areas serviced by public and private 5G networks. The public and private 5G networks may be managed by the same provider of communication services.

Implementations described herein relate to systems and methods for network slice and subscriber profile management for flight paths across multiple networks. A core network may determine which network slices and which subscriber profiles a UAV is to use during particular time slots of a planned flight path. For example, UAV may include multiple embedded Subscriber Identity Modules (eSIMs), corresponding to different subscriber profiles and associated with different PLMN IDs, such as different public 5G networks and/or different private 5G networks with which the UAV may need to communicate. A UAV service supplier (USS) may generate a flight plan for a planned flight path for a UAV along areas serviced by multiple Radio Access Networks (RANs) and may provide information relating to the planned flight path to networks servicing areas along the flight path.

For example, the USS may provide the information relating to the planned flight path to a Network Data Analytics Function (NWDAF) of a core network associated with a RAN servicing an area along the flight path. The flight path information may include a set of locations (e.g., Tracking Area Identity (TAI), etc.), time information associated with the flight path (e.g., a start time for the flight, times when the UAV is expected at particular locations, an end time for the flight, a speed for the UAV, etc.), information identifying a network associated with the location (e.g., a PLMN ID), and/or other types of flight plan information. Additionally, or alternatively, time information for the planned flight path may be obtained based on historical information for the flight path stored by the NWDAF and/or based on information obtained from the Access and Mobility Function (AMF) of the core network as the AMF detects the location of the UAV during the flight. Furthermore, the NWDAF may obtain information identifying one or more applications to be used by the UAV during the flight at particular locations from one or more Application Functions (AFs) in the core network associated with the one or more applications.

The NWDAF may receive the information relating to the planned flight path of the UAV and generate a set of time slot predictions for the flight path. A particular time slot prediction may include information identifying a time slot, a predicted location for the particular time slot, an application to be used by the UAV during the time slot, a network slice selected for the application, a PLMN ID associated with the predicted location, an eSIM profile ID associated with the PLMN ID, whether there is a predicted change in the PLMN during the time slot, and/or other types of information. The NWDAF may select the network slice based on historical performance associated with the predicted location for the application based on Key Performance Indicator (KPI) values collected by the NWDAF. The NWDAF may select the eSIM profile ID based on the PLMN ID associated with the predicted location. Furthermore, the NWDAF may determine whether roaming, between different networks managed by the same provider, is required during the time slot and add information relating to whether roaming is required to the time slot prediction for the time slot.

The AMF of the core network may subscribe to time slot predictions for flight paths generated by the NWDAF and may receive the generated time slot predictions for the planned flight path from the NWDAF. The AMF may generate a set of instructions based on the generated time slot predictions. For example, the AMF may determine whether a selected network slice for a time slot is subscribed to by the UAV and/or whether the selected slice is allowed on the network. If the selected slice is not allowed, the AMF may send a request to a Network Slice Selection Function (NSSF) to allow the slice during the time slot. Furthermore, the AMF may determine whether roaming, between different networks managed by the same provider, is required, or may be needed, during a time slot and may activate roaming for the UAV during the time slot if roaming is required. The AMF may provide a set of instructions for the UAV to an AF in the core network that is associated with the UAV. The AF may forward the set of instructions to the UAV. The instructions may cause the UAV to select particular network slices and eSIM profiles during different time slots of the flight path. The UAV may receive instructions from multiple AFs associated with different networks servicing areas along the planned flight path.

While implementations described herein relate to a planned flight path of a UAV, the systems and methods described herein may also be applied to other types of unmanned autonomous vehicles, such as unmanned autonomous cars, trucks, buses, trains, boats, and/or other types of vehicles on a planned trajectory on land and/or in water.

FIG. 1 is a diagram of an exemplary environment 100 in which the systems and/or methods described herein may be implemented. As shown in FIG. 1, environment 100 may include UAVs 110-A to 110-N (referred to herein collectively as "UAVs 110" and individually as "UAV 110"), RANs 130-A to 130-M (referred to herein collectively as "RANs 130" and individually as "RAN 130"), MEC networks 140-A to 140-M (referred to herein collectively as "MEC networks 140" and individually as "MEC network 140"), core networks 150-A to 150-M (referred to herein collectively as "core networks 150" and individually as "core network 150"), and packet data networks (PDNs) 160-A to 160-Z (referred to herein collectively as "PDNs 160" and individually as "PDN 160").

UAV 110 may include any unmanned aerial vehicle, such as a single rotor aircraft, multirotor aircraft, a fixed wing aircraft, and/or another type of aircraft with cellular wireless communication capabilities. Thus, UAV 110 may include a wireless transceiver configured for 5G wireless communication, other types of cellular wireless communication (e.g., Fourth Generation (4G) communication, etc.), and/or short-range wireless communication, such as WiFi communication. Furthermore, UAV 110 may include one or more sensors for collecting data, such as one or more cameras, microphones, environmental sensors, etc., and one or more actuators to perform various functions, such as robotic arms for picking up and dropping off packages, speakers for delivering audio messages, etc. UAV 110 may include one or more eSIMs that include multiple eSIM profiles for connecting to different 5G networks. Furthermore, UAV 110 may include processors and memory configured to run one or more applications, such as, for example, a flight monitoring application that transmits the location, speed, and elevation of UAV 110; an application that controls pickup and drop-off of a payload carried by UAV 110; a camera application that records and transmits images or videos captured by UAV 110 and transmits captured images or videos using real-time streaming and/or as files at a later time; a sensor application that records and captures other types of data; a navigation application that uses images or video captured by UAV 110 to aid in navigation; a collision detection application that uses images or video captured by UAV 110 to avoid collisions with building, ground vehicles, and/or other UAVs 110; a robotic actuator application for package delivery, connecting to an infrastructure sensor or actuator, delivering an agricultural payload (e.g., fertilizer, pesticide, etc.), and/or another type of actuator application; and/or other types of applications.

RAN 130 may correspond to a public 5G RAN or a private 5G RAN. RAN 130 may include base stations 120 (e.g., base stations 120-A-1 to 120-A-X for RAN 130-A, base stations 120-M-1 to 120-M-Y for RAN 130-M, etc.).

Base station 120 may be configured for one or more Radio Access Technology (RAT) types. For example, base station 120 may include a 5G New Radio (NR) base station (e.g., a gNodeB) and/or a Fourth Generation (4G) Long Term Evolution (LTE) base station (e.g., an eNodeB). Each base station 120 may include devices and/or components that enable cellular wireless communication with UAV 110. For example, base station 120 may include a radio frequency (RF) transceiver configured to communicate with UAVs 110 using a 5G NR air interface, a 4G LTE air interface, and/or using another type of cellular air interface. Base station 120 may enable UAV 110 to communicate with core network 150 and may treat UAV 110 as a user equipment (UE) device attached to base station 120.

MEC network 140 may correspond to a public MEC network or a private MEC network. MEC network 140 may be associated with one or more base stations 120 and may provide MEC services for UAVs 110 attached to the base stations 120. MEC network 140 may be in proximity to base stations 120 from a geographic and network topology perspective, thus enabling low latency communication with UAVs 110 and/or base stations 120. As an example, MEC network 140 may be located on the same site as base station 120. As another example, MEC network 140 may be geographically closer to one of base stations 120 and reachable via fewer network hops and/or fewer switches, than other base stations 120.

MEC network 140 may include one or more MEC devices 145. MEC devices 145 may provide MEC services to UAV 110. A MEC service may include, for example, a low-latency service associated with a particular application, such as, for example, a computer vision application to detect particular types of objects, a collision detection application to detect obstacles and/or the presence of other aerial vehicles, etc. UAV 110 may use an application during a flight that connects to MEC network 140 and uses a MEC service. As another example, a MEC service may include a microservice associated with a virtualized network function (VNF) of core network 150. As yet another example, a MEC service may include a USS service that provides information relating to a planned flight path for UAV 110 to core network 150.

Core network 150 may correspond to a public 5G core network or a private 5G core network. Core network 150 may be managed by a provider of cellular wireless communication services and may manage communication sessions of subscribers connecting to core network 150 via RAN 130. For example, core network 150 may establish an Internet Protocol (IP) connection between UAVs 110 and PDN 160. Exemplary components of a 5G core network are described below with reference to FIG. 2. In some implementations, core network 150 may also include a 4G core network (e.g., an evolved packet core (EPC) network) and/or another type of core network.

The components of core network 150 may be implemented as dedicated hardware components or as virtualized functions implemented on top of a common shared physical infrastructure using SDN. For example, an SDN controller may implement one or more of the components of core network 150 using an adapter implementing a virtual network function (VNF) virtual machine, a Cloud Native Function (CNF) container, an event driven serverless architecture interface, and/or another type of SDN component. The common shared physical infrastructure may be implemented using one or more devices 300 described below with reference to FIG. 3 in a cloud computing center associated with core network 150. Additionally, or alternatively, some, or all, of the shared physical infrastructure may be implemented using one or more devices 300 implemented in MEC device 145 in MEC network 140.

PDNs 160-A to 160-Z may each include a PDN. A particular PDN 160 may be associated with a Data Network Name (DNN) in 5G, and/or an Access Point Name (APN) in 4G. UAV 110 may request a connection to PDN 160 using a DNN or an APN. PDN 160 may include, and/or be connected to, a local area network (LAN), a wide area network (WAN), a metropolitan area network (MAN), an autonomous system (AS) on the Internet, an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, or a combination of networks.

PDN 160 may include an application server 170 (shown in PDN 160-A in FIG. 1 for illustrative purposes). Application server 170 may provide services for an application running on UAV 110 and may establish an application session with UAV 110 via RAN 130 and core network 150. Additionally, or alternatively, application server 170 may communicate with UAV 110 via an AF in core network 150. In some implementations, application server 170 may function as a USS that provides information relating to a planned flight path for UAV 110 to core network 150. Furthermore, in some implementations, application server 170 may implement a network management system that provides network information to core network 150, such as, for example, PLMN IDs associated with other networks and/or eSIM profile ID information associated with UAV 110 for the PLMN IDs.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
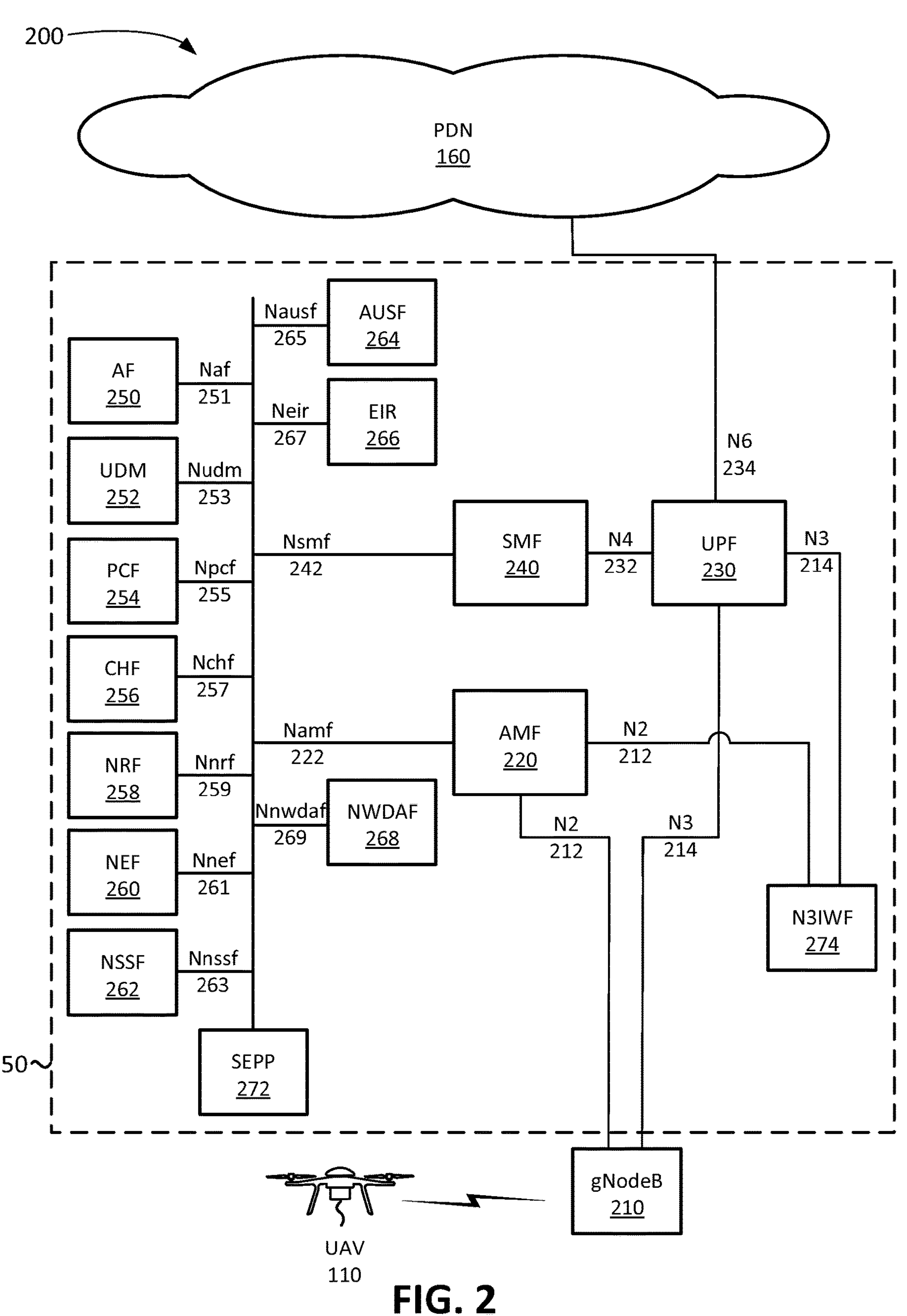
FIG. 2 is a diagram illustrating exemplary components of a Fifth Generation (5G) core network according to an implementation described herein.

FIG. 2 illustrates a system 200 that includes exemplary components of core network 150 in the context of environment 100 according to an implementation described herein. As shown in FIG. 2, system 200 may include UAV 110, gNodeB 210, core network 150, and PDN 160. [0035] gNodeB 210 (corresponding to base station 120) may include devices (e.g., base stations) and components that enable UAV 110 to connect to core network 150 via RAN 130 using 5G NR RAT. For example, gNodeB 210 may service one or more cells, with each cell being served by a wireless transceiver with an antenna array configured for mm-wave wireless communication. gNodeB 210 may communicate with AMF 220 using an N2 interface 212 and communicate with UPF 230 using an N3 interface 214.

Core network 150 may include an AMF 220, a User Plane Function (UPF) 230, a Session Management Function (SMF) 240, an AF 250, a Unified Data Management (UDM) 252, a Policy Control Function (PCF) 254, a Charging Function (CHF) 256, a Network Repository Function (NRF) 258, a Network Exposure Function (NEF) 260, an NSSF 262, an Authentication Server Function (AUSF) 264, a 5G Equipment Identity Register (EIR) 266, an NWDAF 268, a Security Edge Protection Proxy (SEPP) 272, and a Non-3GPP Inter-Working Function (N3IWF) 274.

While FIG. 2 depicts a single AMF 220, UPF 230, SMF 240, AF 250, UDM 252, PCF 254, CHF 256, NRF 258, NEF 260, NSSF 262, AUSF 264, EIR 266, NWDAF 268, SEPP 272, and N3IWF 274 for illustration purposes, in practice, core network 150 may include multiple AMFs 220, UPFs 230, SMFs 240, AFs 250, UDMs 252, PCFs 254, CHFs 256, NRFs 258, NEFs 260, NSSFs 262, AUSFs 264, EIRs 266, NWDAFs 268, SEPPs 272, and/or N3IWFs 274.

AMF 220 may perform registration management, connection management, reachability management, mobility management, lawful intercepts, session management messages transport between UAV 110 and SMF 240, access authentication and authorization, location services management, functionality to support non-3GPP access networks, and/or other types of management processes. AMF 220 may be accessible by other function nodes via an Namf interface 222. AMF 220 may subscribe to notifications from NWDAF 268 of new time slot predictions for a planned flight path for UAV 110. AMF 220 may generate instructions based on time slot predictions received from NWDAF 268, instructing UAV 110 to select network slices and eSIM profiles during particular time slots of a flight path, and send the generated instructions to AF 250 to provide to UAV 110. Furthermore, AMF 220 may provide location information for UAV 110 to NWDAF 268 (e.g., at the beginning of a planned flight) and NWDAF 268 may use the location information, together with historical flight information, to generate time slot predictions for the flight for UAV 110.

UPF 230 may maintain an anchor point for intra/inter-RAT mobility, maintain an external Protocol Data Unit (PDU) point of interconnect to a particular data network (e.g., PDN 160), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNodeB 210), and/or perform other types of user plane processes. UPF 230 may communicate with SMF 240 using an N4 interface 232 and connect to PDN 160 using an N6 interface 234.

SMF 240 may perform session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, terminate interfaces toward PCF 254, perform lawful intercepts, charge data collection, support charging interfaces, control and coordinate charging data collection, terminate session management parts of Non-Access Stratum (NAS) messages, perform downlink data notification, manage roaming, and/or perform other types of control plane processes for managing user plane data. SMF 240 may be accessible via an Nsmf interface 242.

AF 250 may provide services associated with a particular application, such as, for example, an application for influencing traffic routing, an application for accessing NEF 260, an application for interacting with a policy framework for policy control, and/or other types of applications. Furthermore, AF 250 may provide information to NWDAF 268 relating to an application that is to be used by UAV 110 at a particular location during a planned flight and NWDAF 268 may use the information to predict a network slice for UAV 110 during the flight at the particular location. AF 250 may be accessible via an Naf interface 251, also referred to as an NG5 interface. In some implementations, AF 250 may correspond to, or interface with application server 170. AF 250 may provide instructions, received from AMF 220, to UAV 110 to select network slices and eSIM profiles during particular time slots of a flight path.

UDM 252 may maintain subscription information for UAVs 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via a Nudm interface 253. UDM 252 may store a list of subscribed network slices for UAV 110 in the subscriber profile associated with UAV 110 and may provide the list of subscribed network slices to AMF 220 upon request.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may receive a request from NEF 260 to create a data flow with a QoS characteristic in a network slice, map the QoS characteristic to a QoS Class Identifier (QCI), and create the data flow in the network slice. PCF 254 may be accessible via Npcf interface 255. CHF 256 may perform charging and/or billing functions for core network 150. CHF 256 may be accessible via Nchf interface 257.

NRF 258 may support a service discovery function and maintain profiles of available network function (NF) instances and their supported services. An NF profile may include, for example, an NF instance ID, an NF type, a PLMN ID associated with the NF, network slice IDs associated with the NF, capacity information for the NF, service authorization information for the NF, supported services associated with the NF, endpoint information for each supported service associated with the NF, and/or other types of NF information. NRF 258 may be accessible via an Nnrf interface 259.

NEF 260 may expose capabilities and events to other NFs, including third party NFs, AFs, edge computing NFs, and/or other types of NFs. Furthermore, NEF 260 may secure provisioning of information from external applications to core network 150, translate information between core network 150 and devices/networks external to core network 150, support a Packet Flow Description (PFD) function, and/or perform other types of network exposure functions. NEF 260 may be accessible via Nnef interface 261.

NSSF 262 may select a set of network slice instances to serve a particular UAV 110, determine network slice selection assistance information (NSSAI) or a Single-NSSAI (S-NSSAI), determine a particular AMF 220 to serve a particular UAV 110, and/or perform other types of processing associated with network slice selection or management. NSSF 262 may be accessible via Nnssf interface 263. NSSF 262 may provide a list of allowed slices to AMF 220 and/or may activate a network slice for a particular time slot in response to a request from AMF 220.

AUSF 264 may perform authentication. For example, AUSF 264 may implement an Extensible Authentication Protocol (EAP) authentication server and may store authentication keys for UAVs 110. AUSF 264 may be accessible via Nausf interface 265. EIR 266 may authenticate a particular UAV 110 based on UE device identity, such as a Permanent Equipment Identifier (PEI). For example, EIR 266 may check to determine if a PEI has been blacklisted. EIR 266 may be accessible via Neir interface 267.

NWDAF 268 may collect analytics information associated with radio access network 120 and/or core network 150. For example, NWDAF 268 may collect accessibility Key Performance Indicators (KPIs) (e.g., a Radio Resource Control (RRC) connection setup success rate, a Radio Access Bearer (RAB) success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, packet drop rate, etc.), utilization KPIs (e.g., resource block utilization rate, average processor load, etc.), availability KPIs (e.g., radio network unavailability rate, etc.), traffic KPIs (e.g., downlink traffic volume/throughput, uplink traffic volume/throughput, average number of users, maximum number of users, a number of voice bearers, a number of video bearers, etc.), response time KPIs (e.g., radio link latency, transport network latency, end-to-end latency, packet arrival time, etc.), and/or other types of wireless network KPIs. NWDAF 268 may collect KPI values for different locations for applications running on particular network slices and generate historical performance data based on the collected KPI values. NWDAF 268 may collect the KPI values from UAV 110 and/or from UPF 230 via SMF 240. NWDAF 268 may use the historical performance data to predict a network slice for UAV 110 based on a predicted location of UAV 110 and an application to be used at the predicted location. Furthermore, NWDAF 268 may predict eSIM profiles for UAV 110 based on predicted locations for UAV 110 during a planned flight and PLMN IDs associated with the predicted locations. NWDAF 268 may receive a planned flight path for UAV 110, from a USS associated with UAV 110, generate a set of time slot predictions for the planned flight path, and provide the generated set of time slot predictions to AMF 220.

SEPP 272 may implement application layer security for all layer information exchanged between two NFs across two different PLMNs. N3IWF 274 may interconnect to a non-3GPP access device, such as, for example, a WiFi Access Point. N3IWF 274 may facilitate handovers for UAV 110 between RAN 130 and the non-3GPP access device. N3IWF 274 may be accessible via Nn3iwf interface 275.

Although FIG. 2 shows exemplary components of core network 150, in other implementations, core network 150 may include fewer components, different components, differently arranged components, or additional components than depicted in FIG. 2. Additionally, or alternatively, one or more components of core network 150 may perform functions described as being performed by one or more other components of core network 150. For example, core network 150 may include additional function nodes not shown in FIG. 2, such as a Unified Data Repository (UDR), an Unstructured Data Storage Network Function (UDSF), a Location Management Function (LMF), a Lawful Intercept Function (LIF), a Binding Session Function (BSF), and/or other types of functions. Furthermore, while particular interfaces have been described with respect to particular function nodes in FIG. 2, additionally, or alternatively, core network 150 may include a reference point architecture that includes point-to-point interfaces between particular function nodes.

Figure 3:
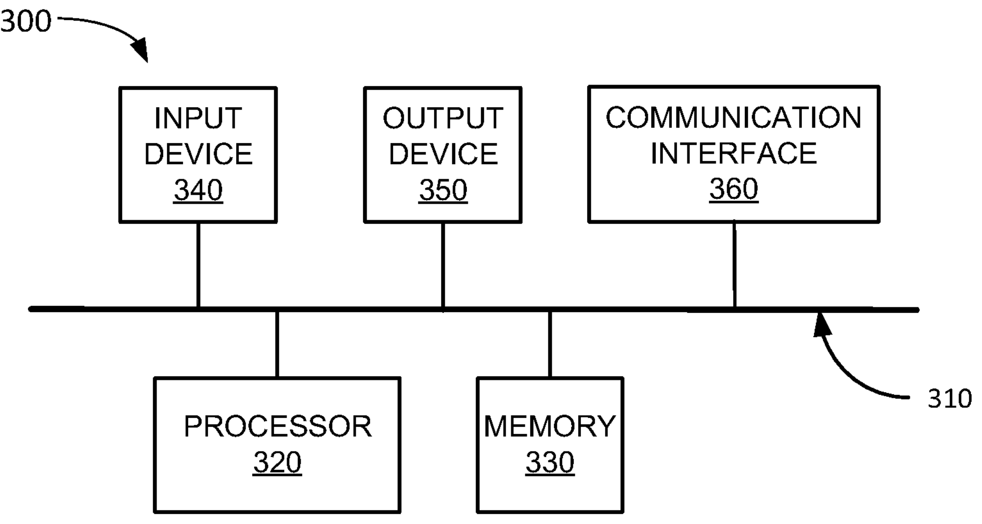
FIG. 3 illustrates exemplary components of a device that may be included in a component of an environment according to an implementation described herein.

FIG. 3 illustrates example components of a device 300 according to an implementation described herein. UAV 110, base station 120, MEC device 145, application server 170, gNodeB 210, AMF 220, UPF 230, SMF 240, AF 250, UDM 252, PCF 254, CIF 256, NRF 258, NEF 260, NSSF 262, AUSF 264, EIR 266, NWDAF 268, SEPP 272, N3IWF 274, and/or other components of core network 150 or RAN 130, may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., RF, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to network slice and subscriber profile management for flight paths across multiple networks. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
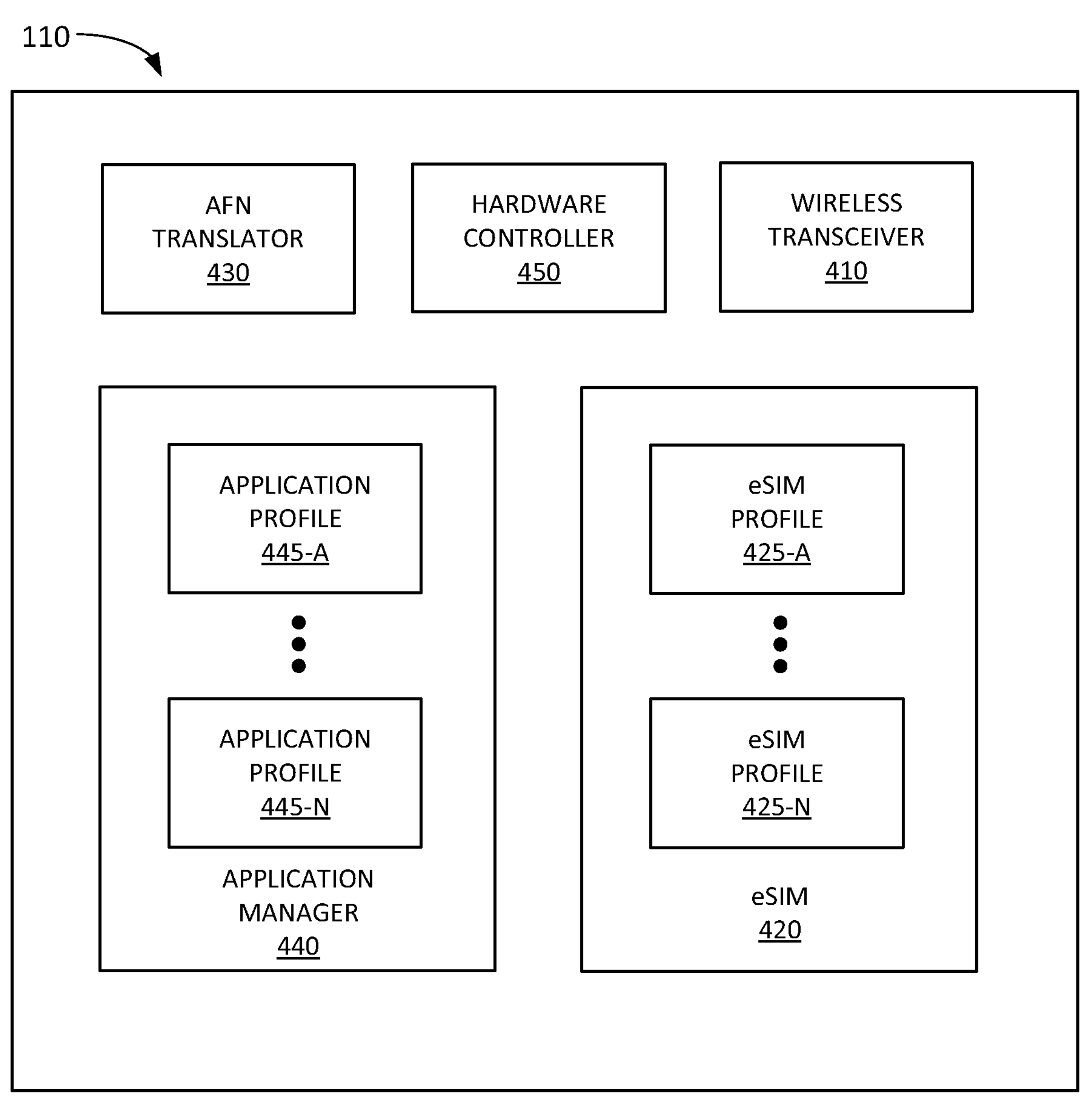
FIG. 4 illustrates exemplary components of an Unmanned Aerial Vehicle (UAV) according to an implementation described herein.

FIG. 4 is a diagram illustrating exemplary components of UAV 110. The components of UAV 110 may be implemented, for example, via processor 320 executing instructions from memory 330. Alternatively, some or all of the components of UAV 110 may be implemented via hardwired circuitry. As shown in FIG. 4, UAV 110 may include a wireless transceiver 410, eSIM 420, AF notifications (AFN) translator 430, an application manager 440, and a hardware controller 450.

Wireless transceiver 410 may be configured to communicate with base station 120 using 5G cellular wireless signals. eSIM 420 may include multiple eSIM profiles 425-A to 425-N. Each eSIM profile 425 may enable UAV 110 to attach to a network associated with a particular PLMN ID. eSIM profile 425 may be associated with a subscriber ID, such as, for example, a Mobile Directory Number (MDN), an International Mobile Subscriber Identity (IMSI), a Mobile Station International Subscriber Directory Number (MSISDN), an International Mobile Equipment Identity (IMEI), and/or another type of identifier associated with UAV 110. UAV 110 may use eSIM profile 425 to attach to core network 150, to authenticate and authorize attachment to core network 150, and to authenticate and authorize the use of particular network slices in core network 150 based on a subscription associated with UAV 110.

AFN translator 430 may receive a notification from AF 250 and translate the notification into an instruction for an application via application manager 440. Application manager 440 may manage one or more application profiles 445-A to 445-N for applications installed on UAV 110. The instruction from AFN translator 430 may instruct an application to request a particular network slice when the application requests to initiate a communication session with core network 150 via RAN 130. Furthermore, the instruction may cause eSIM 420 to select a particular eSIM profile 425. Hardware controller 450 may control the hardware of UAV 110, such as the flight controlling machinery of UAV 110, sensors installed on UAV 110, and/or actuators installed on UAV 110. An application may use hardware controller 450 to control the flight machinery, sensors, and/or actuators associated with UAV 110.

Although FIG. 4 shows exemplary components of UAV 110, in other implementations, UAV 110 may include fewer components, different components, additional components, or differently arranged components than depicted in FIG. 4. Additionally, or alternatively, one or more components of UAV 110 may perform one or more tasks described as being performed by one or more other components of UAV 110.

Figure 5:
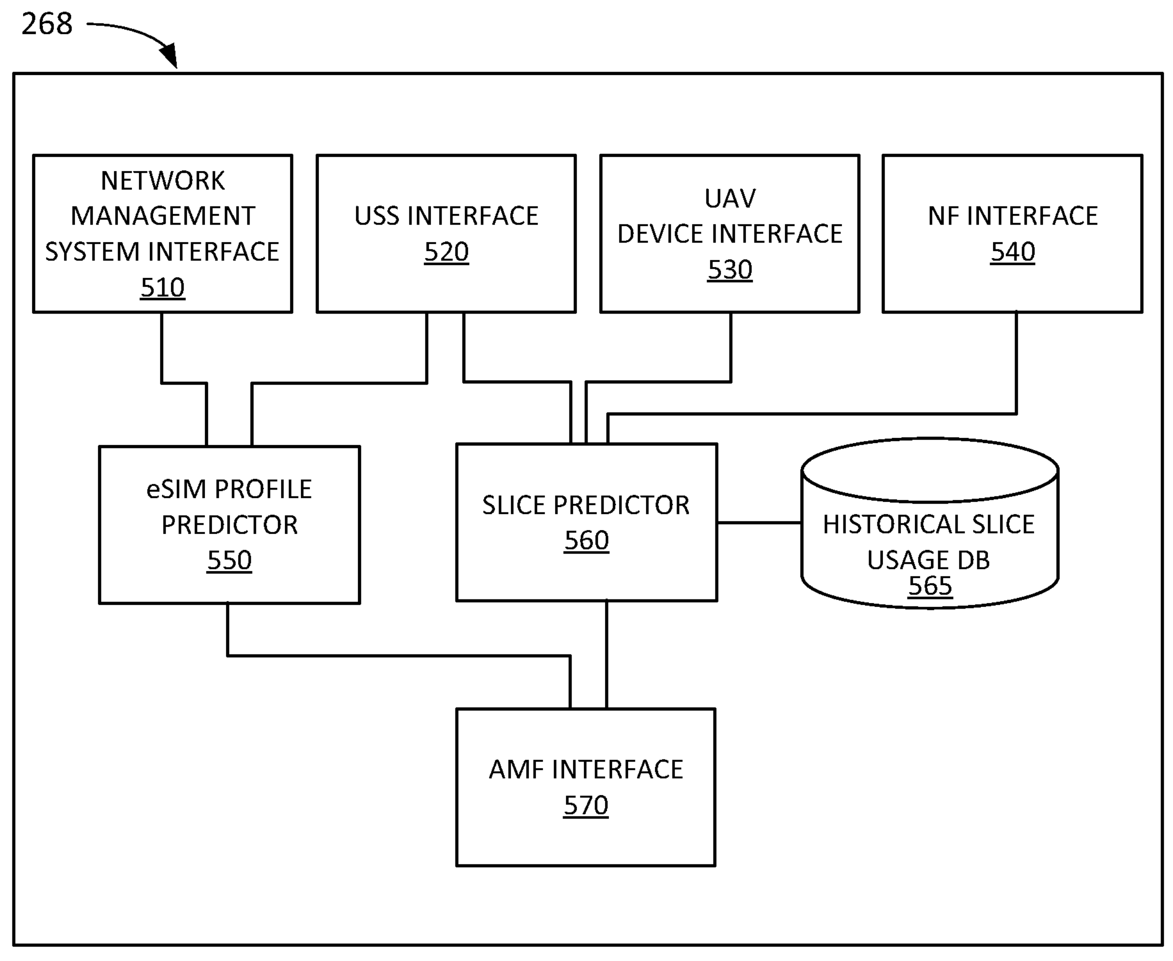
FIG. 5 is a diagram of exemplary components of a Network Data Analytics Function (NWDAF) device according to an implementation described herein.

FIG. 5 is a diagram illustrating exemplary components of NWDAF 268. The components of NWDAF 268 may be implemented, for example, via processor 320 executing instructions from memory 330. Alternatively, some or all of the components of NWDAF 268 may be implemented via hard-wired circuitry. As shown in FIG. 5, NWDAF 268 may include a network management system interface 510, a USS interface 520, a UAV device interface 530, an NF interface 540, an eSIM profile predictor 550, a slice predictor 560, a historical slice usage database (DB) 565, and an AMF interface 570.

Network management system interface 510 may be configured to communicate with a network management system (e.g., included in application server 170, etc.) that maintains information relating to networks, such as PLMN IDs for networks servicing particular areas, and/or eSIM profile IDs associated with different PLMN IDs. Network management system interface 510 may provide information received from a network management system to eSIM profile predictor 550.

USS interface 520 may be configured to communicate with a USS (e.g., included in application server 170, in MEC device 145, etc.) and may receive information relating to a planned flight path for UAV 110 from the USS. USS interface 520 may provide the received flight path information to eSIM profile predictor 550 and/or slice predictor 560. UAV device interface 530 may be configured to communicate with UAV 110 and may receive KPI values for a set of KPI parameters from UAV 110 along with information identifying a location, an application, and a network slice associated with the KPI values. UAV interface 530 may provide the received information to slice predictor 560 to store in historical slice usage DB 565.

NF interface 540 may be configured to communicate with NFs in core network 150, such as SMF 240, AF 250, and/or other NFs in core network 150. As an example, NF interface 540 may be configured to communicate with SMF 240 and may receive KPI values for a set of KPI parameters from SMF 240 for UAV 110 along with information identifying a location and an application and a network slice used by UAV 110 during a PDU session associated with the KPI values. NF interface 540 may provide the received information to slice predictor 560 to store in historical slice usage DB 565. As another example, NF interface 540 may be configured to communicate with AF 250 and receive information identifying an application to be use by UAV 110 at a location during a planned flight. NF interface 540 may provide the received information to slice predictor 560 to predict a network slice based on the received information.

eSIM profile predictor 550 may predict an eSIM profile that is to be selected for UAV 110 based on a PLMN ID associated with a location along a planned flight path of UAV 110. eSIM profile predictor 550 may receive information identifying an eSIM profile of UAV 110 associated with a PLMN ID from a network management system or from another core network 150. In some implementations, eSIM profile predictor 550 may predict a ranked list of eSIM profiles that are to be selected for UAV 110 for a particular time slot, with the first eSIM profile on the list being the most preferred eSIM profile to be selected, followed by the second most preferred eSIM profile, etc.

Slice predictor 560 may predict a network slice that is to be selected for UAV 110 for a time slot during a planned flight path of UAV 110 based on a predicted location during the time slot, the application UAV 110 is to use during the time slot, and historical usage information stored in historical slice usage DB 565. Historical slice usage DB 565 may store historical slice usage for different applications, locations, and/or time periods. For example, historical slice usage DB 565 may store a set of KPI values, such as latency, throughput, packet drop rate, packet error rate, etc. for an application using a network slice at a location.

In some implementations, slice predictor 560 may use an explicit set of rules to predict a network slice that is to be selected. For example, slice predictor 560 may predict a network slice, that is to be selected, which satisfies the service requirements associated with application (e.g., latency) at a predicted location and time while using the least amount of network resources. In other implementations, slice predictor 560 may use a trained machine learning model to predict a network slice. The machine learning model may be trained using a training set of historical slice usage data labeled by a domain expert with manually selected network slices for particular combinations of application requirements, locations, and KPI values. In some implementations, slice predictor 560 may predict a ranked list of network slices that are to be selected for UAV 110 for a particular time slot, with the first network slice on the list being the most preferred network slice to be selected, followed by the second most preferred network slice, etc.

AMF interface 570 may be configured to communicate with AMF 220. For example, AMF interface 570 may receive a subscription request from AMF 220 to receive a set of time slot predictions for a planned flight path for UAV 110 and may provide the set of time slot predictions when a set of time slot predictions is generated. Additionally, in some implementations, AMF interface 570 may receive location information for UAV 110 from AMF 220 and provide the location information to eSIM profile predictor 550 and/or slice predictor 560.

Although FIG. 5 shows exemplary components of NWDAF 268, in other implementations, NWDAF 268 may include fewer components, different components, additional components, or differently arranged components than depicted in FIG. 5. Additionally, or alternatively, one or more components of NWDAF 268 may perform one or more tasks described as being performed by one or more other components of NWDAF 268.

Figure 6:
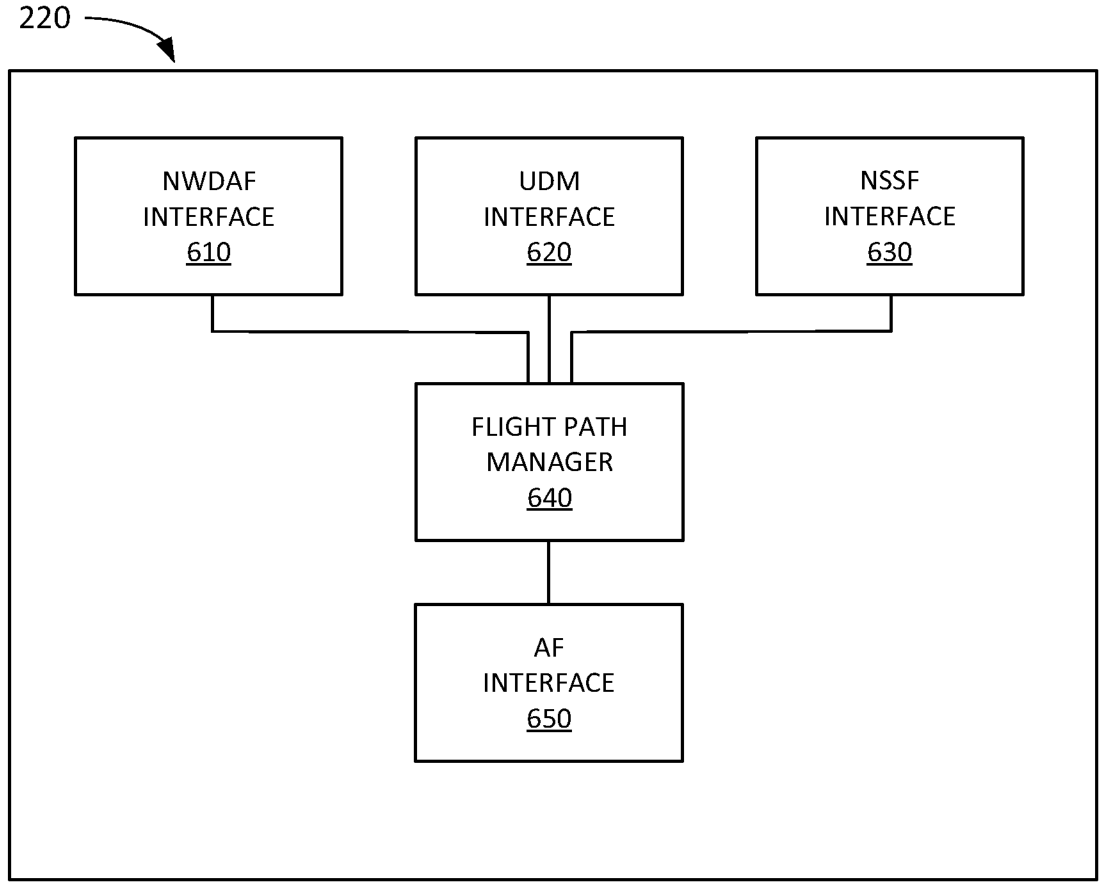
FIG. 6 is a diagram of exemplary components of an Access and Mobility Function (AMF) device according to an implementation described herein.

FIG. 6 is a diagram illustrating exemplary components of AMF 220. The components of AMF 220 may be implemented, for example, via processor 320 executing instructions from memory 330. Alternatively, some or all of the components of AMF 220 may be implemented via hard-wired circuitry. As shown in FIG. 6, AMF 220 may include a NWDAF interface 610, a UDM interface 620, an NSSF interface 630, a flight path manager 640, and an AF interface 650.

NWDAF interface 610 may be configured to communicate with NWDAF 268. For example, NWDAF interface 610 may subscribe to NWDAF 268 to receive time slot predictions, location (e.g., TAI, etc.) predictions, network slice predictions, and/or other types of predictions generated for a planned flight path for UAV 110. NWDAF interface 610 may provide information received from NWDAF 268 to flight path manager 640. Furthermore, in some implementations, NWDAF interface 610 may provide location information for UAV 110 to NWDAF 268. UDM interface 620 may be configured to communicate with UDM 252. For example, UDM interface 620 may obtain information identifying a set of network slices to which UAV 110 is subscribed from UDM 252. NSSF interface 630 may be configured to communicate with NSSF 262. For example, NSSF interface 630 may obtain a list of allowed slices in core network 150 for a time period associated with a time slot of a planned flight path for UAV 110. Furthermore, NSSF interface 630 may send a request to NSSF 262 to activate/allow/enable or deactivate/disallow/disable a network slice for a time period associated with a time slot of a planned flight path for UAV 110.

Flight path manager 640 may select eSIM profiles for particular time slots during the planned flight for UAV 110 based on predicted eSIM profile information for the particular time slots received from NWDAF 268. Furthermore, flight path manager 640 may select network slices for particular time slots during the planned flight for UAV 110 based on predicted network slice information for the particular time slots received from NWDAF 268.

Flight path manager 640 may generate a set of instructions for UAV 110 based on subscriber network slices for UAV 110, allowed network slices in core network 150 during a time slot of a planned flight path, and based on network slices predicted for time slots by NWDAF 268. AF interface 650 may be configured to communicate with AF 250. For example, AMF 220 may provide a generated set of instructions for UAV 110 to AF 250 to provide to UAV 110.

Although FIG. 6 shows exemplary components of AMF 220, in other implementations, AMF 220 may include fewer components, different components, additional components, or differently arranged components than depicted in FIG. 6. Additionally, or alternatively, one or more components of AMF 220 may perform one or more tasks described as being performed by one or more other components of AMF 220.

Figure 7:
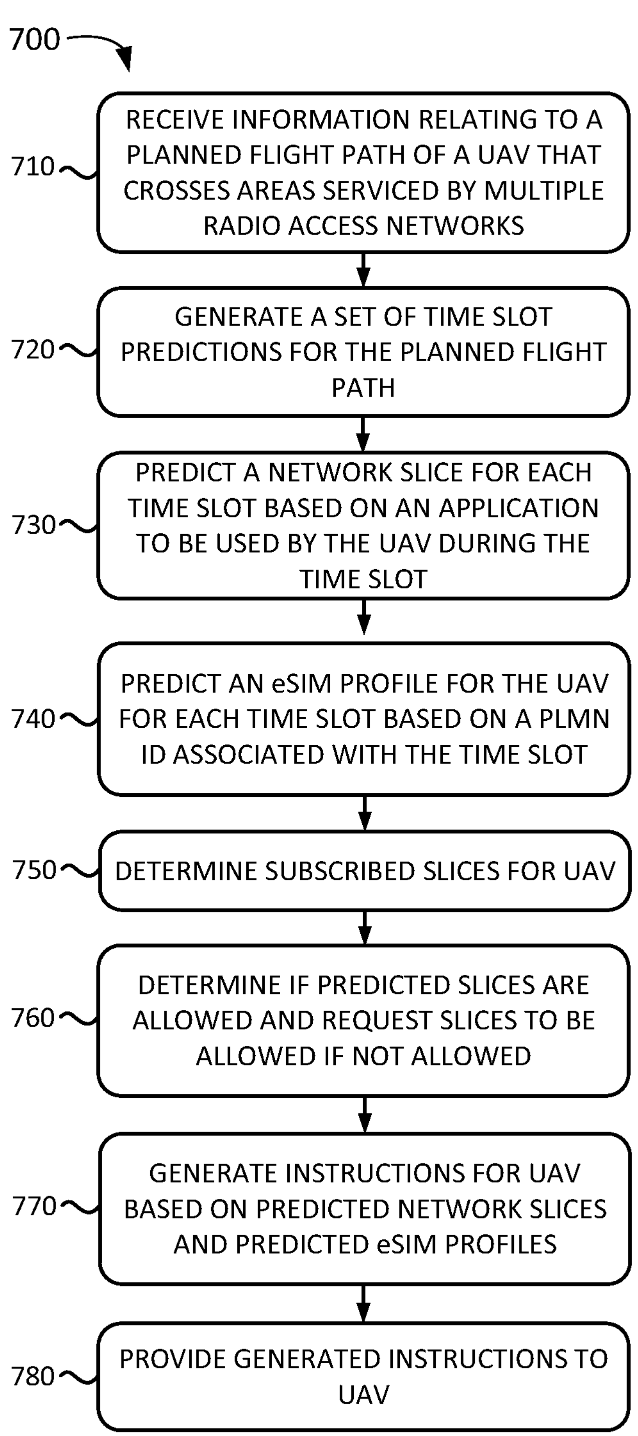
FIG. 7 illustrates a flowchart for providing instructions for selecting network slices and subscriber profiles to a UAV according to an implementation described herein.

FIG. 7 illustrates a flowchart of a process 700 for providing instructions for selecting network slices and subscriber profiles to a UAV according to an implementation described herein. In some implementations, process 700 of FIG. 7 may be performed by NWDAF 268, AMF 220, AF 250, UDM 252, NEF 260, NSSF 262, and/or another component of core network 150 and/or MEC network 140. In other implementations, some or all of process 700 may be performed by another device or a group of devices.

As shown in FIG. 7, process 700 may include receiving information relating to a planned flight path of a UAV that crosses areas serviced by multiple RANs (block 710). For example, a USS for UAV 110 may provide information relating to a planned flight path of UAV 110 to NWDAF 268. The information may include, for example, trajectory information including a series of locations, a start time and/or a finish time for the flight, a speed and/or elevation of UAV 110 at a particular location, an application to be used by UAV 110 at a particular location, information identifying a network associated with a location (e.g., a PLMN ID), and/or other types of flight plan information. In some implementations, NWDAF 268 may receive location information for UAV 110 from AMF 220 (e.g., at the start of a flight, etc.) and may use the location information, together with historical information stored in historical slice usage DB 565, to determine time information used to predict time slots for the planned flight. NWDAF 268 may further receive information from one or more AFs 250 indicating one or more applications to be used by UAV 110 at particular locations during the planned flight.

Process 700 may further include generating a set of time slot predictions for the planned flight path (block 720). For example, NWDAF 268 may generate a set of time slot predictions for the time slots associated with the planned flight path. A time slot prediction may include a time slot duration, a predicted location during the time slot as a TAI identifying a cell of base station 120 servicing the predicted location, and one or more applications to be used by UAV 110 during the time slot. The time slot prediction may further include a predicted network slice, a PLMN ID and an associated predicted eSIM profile, and information identifying whether there is a network change from a previous time slot and whether roaming, between different networks managed by the same provider, is to be activated for UAV 110 during the time slot.

Process 700 may further include predicting a network slice for each time slot based on an application to be used by the UAV during the time slot (block 730). For example, NWDAF 268 may predict a preferred network slice (or a ranked list of preferred network slices) for UAV 110 to use during the time slot based on the predicted location, the application to be used by UAV 110 during the time slot, and historical usage information collected by NWDAF 268.

Process 700 may further include predicting an eSIM profile for the UAV for each time slot based on a PLMN ID associated with the time slot (block 740). For example, NWDAF 268 may predict an eSIM profile (or a ranked list of preferred eSIM profiles) that UAV 110 is to use to attach to core network 150 during the time slot, based on the PLMN ID of the network servicing the predicted location during the time slot.

Process 700 may further include determining subscribed network slices for the UAV (block 750), and determining if selected network slices are allowed and requesting network slices to be allowed if the network slices are not allowed (block 760). For example, NWDAF 268 may send the time slot predictions to AMF 220. Thus, AMF 220 may receive, from NWDAF 268, the predicted preferred network slice (or the ranked list of preferred network slices) for UAV 110 to use during each time slot and may select a network slice for each time slot based on the information received from NWDAF 268. AMF 220 may first check with UDM 252 to make sure the selected network slices during the planned flight path are network slices to which UAV 110 has subscribed. In some implementations, if a selected network slice is not included in the set of network slices to which UAV 110 has subscribed, AMF 220 may send a request to NWDAF 268 to select another network slice for the time slot. NWDAF 268 may select another network slice (e.g., the second-best network slice, etc.) and provide information identifying the selected other network slice to AMF 220. Furthermore, AMF 220 may check with NSSF 262 if the selected network slices are allowed in core network 150 during the requisite time slots. If a selected network slice is not allowed, AMF 220 may send a request to NSSF 262 to activate/allow/enable the selected network slice. AMF 220 may send the request to NSSF 262 to activate/allow/enable the selected network slice in advance of UAV 110 reaching a location where the selected network slice is required so that the selected network slice is enabled by NSSF 262 before the selected network slices is needed by UAV 110.

Process 700 may further include generating instructions for the UAV based on the predicted network slices and the predicted eSIM profiles (block 770) and providing the generated instructions to the UAV (block 780). AMF 220 may receive, from NWDAF 268, the predicted preferred eSIM profile (or the ranked list of preferred eSIM profiles) for UAV 110 to use during each time slot and may select an eSIM profile for each time slot based on the information received from NWDAF 268. AMF 220 may then generate a table that specifies, for a time slot, the selected network slice, the selected eSIM profile, whether there is a change in the network slice from a previous time slot, whether there is a network change from a previous time slot, and/or whether roaming is to be activated by UAV 110 during the time slot. AMF 220 may provide the instructions to AF 250 and AF 250 may provide the instructions to UAV 110. UAV 110 may then use the received instructions to select network slices and eSIM profiles during the flight path.

Figure 8:
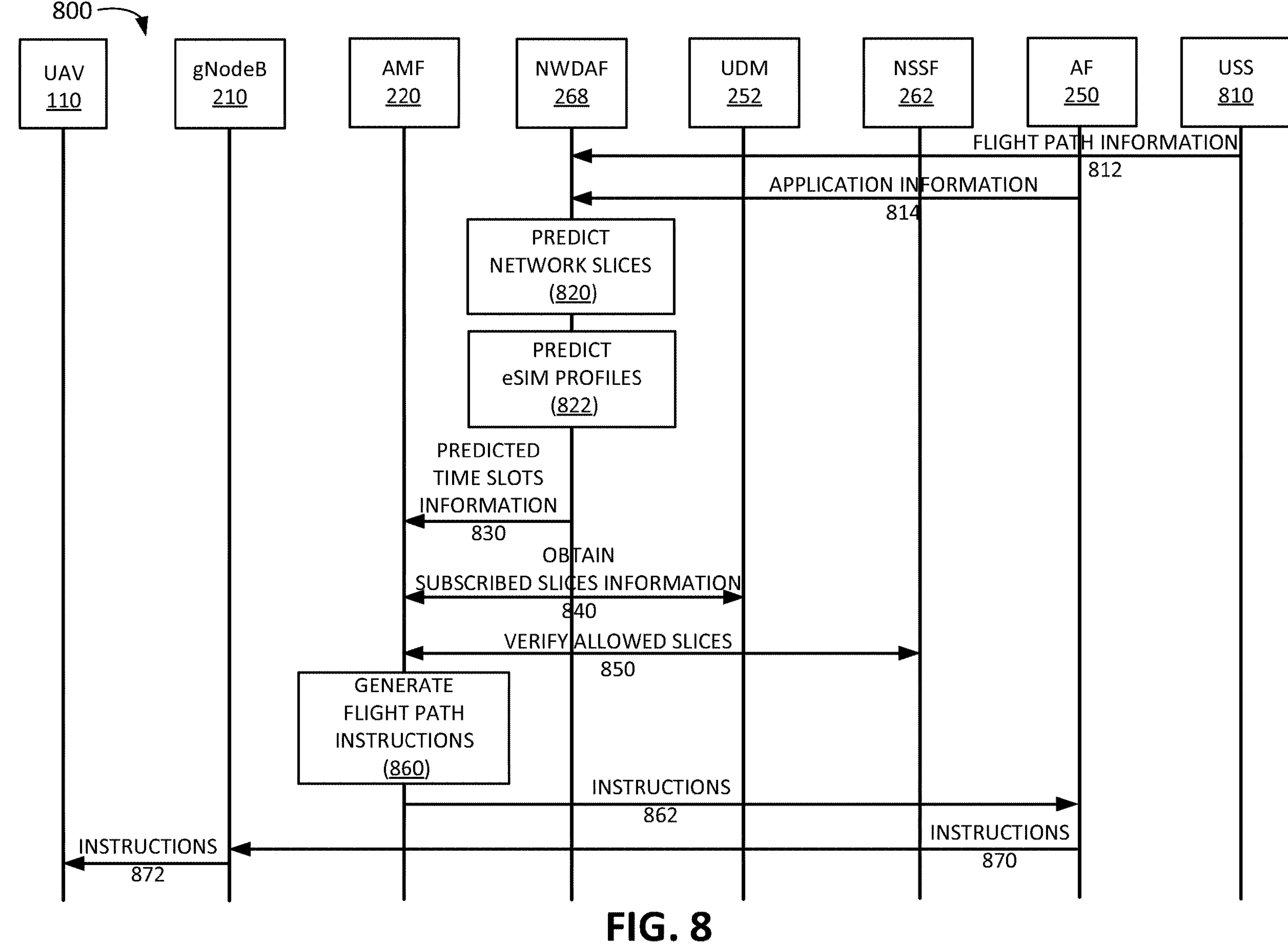
FIG. 8 illustrates an exemplary signal flow according to an implementation described herein.

FIG. 8 illustrates an exemplary signal flow 800 according to an implementation described herein. Signal flow 800 does not necessarily illustrate all signals sent during the process described below. As shown in FIG. 8, signal flow 800 may include a USS 810 sending flight path information for a planned flight to NWDAF 268 (signal 812) and AF 250 sending application information for application to be used during the planned flight to NWDAF 268 (signal 814). Based on the received flight path information, NWDAF 268 may generate a set of time slot predictions. Generating the time slot predictions may include predicting network slices for particular time slots based on applications that are to be used by UAV 110 and historical performance of the applications at predicted locations associated with the particular time slots (block 820) and predicting eSIM profiles for the particular times slots based on PLMN IDs associated with the predicted locations for the particular time slots (block 822).

NWDAF 268 may provide the set of time slot predictions to AMF 220 (signal 830). AMF 220 may obtain a list of subscribed network slices for UAV 110 from UDM 252 (signal 840) and verify that UAV 110 is subscribed to each of the predicted network slices to be used during the flight path. AMF 220 may then verify with NSSF 262 that each of the predicted network slices is allowed in the network associated with the time slot during which a predicted network slice is to be used by UAV 110 (signal 850). If a predicted network slice is not allowed in the network, AMF 220 may send a request to NSSF 262 to activate the selected network slice.

AMF 220 may then generate flight path instructions for UAV 110 based on the received time slot predictions (block 860). For example, AMF 220 may select network slices for the planned flight path for UAV 110 based on the predicted network slices for particular time slots and select eSIM profiles for the planned flight path for UAV 110 based on the predicted eSIM profile for particular time slots. The flight path instructions may instruct UAV 110 to select a particular network slice and a particular eSIM profile for particular time slots during the flight path. If roaming, between different networks managed by the same provider, is required during a time slot, the instructions may indicate to activate roaming for UAV 110. AMF 220 may provide the generated instructions to AF 250 (signal 862). AF 250 may forward the instructions to UAV 110 via gNodeB 210 (signals 870 and 872).

Figure 9:
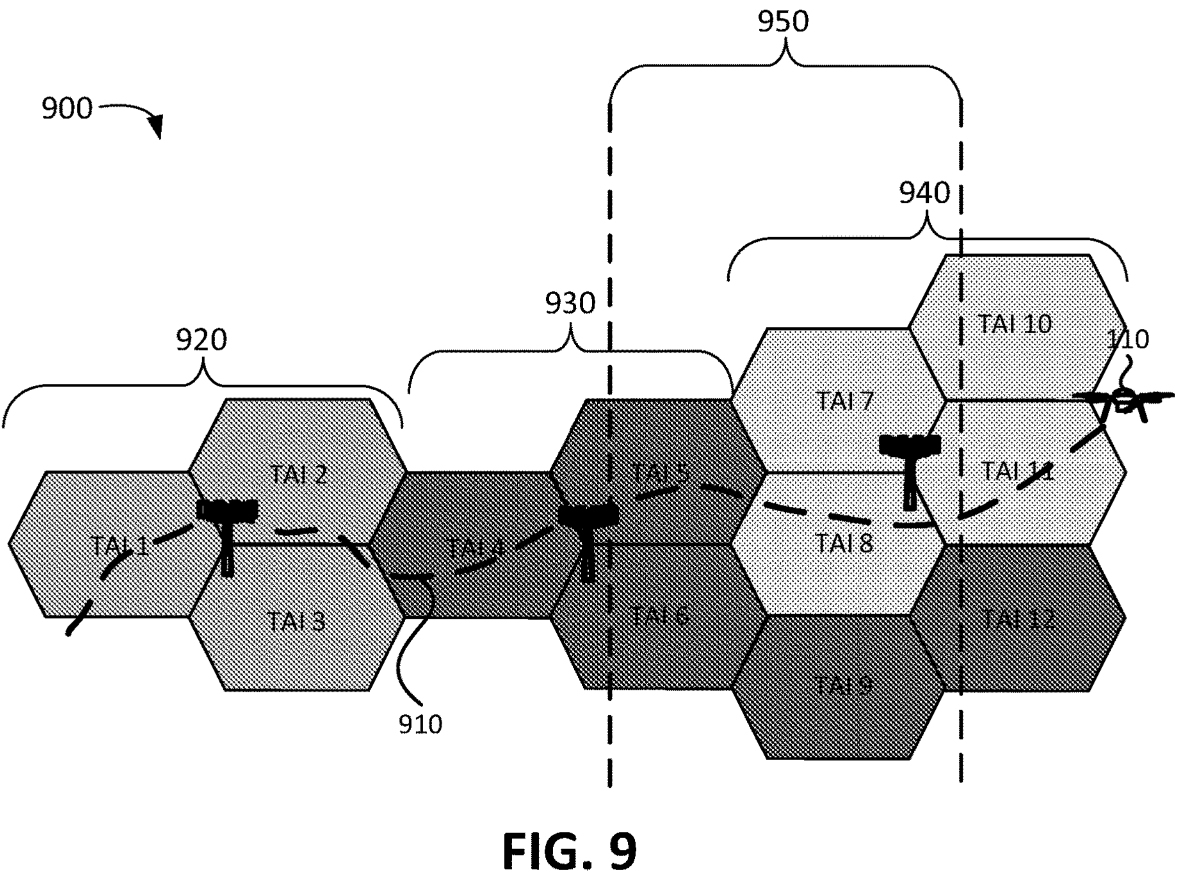
FIG. 9 illustrates an exemplary flight path according to an implementation described herein.

FIG. 9 illustrates an exemplary flight path environment 900 according to an implementation described herein. As shown in FIG. 9, flight path environment 900 may include a planned flight path 910 (shown via the dashed line in FIG. 9) of UAV 110 through three different networks: network 920, network 930, and network 940. In some implementation, network 920, network 930, and network 940 may be managed by the same provider of wireless communication services. Network 920 may correspond to a first private 5G network that services cells with TAI 1, TAI 2, and TAI 3. Network 930 may correspond to a public 5G network that services cells with TAI 4, TAI 5, TAI 6, TAI 9 and TAI 12. Network 940 may correspond to a second private 5G network that services cells with TAI 7, TAI 8, TAI 10, and TAI 11. Planned flight path 910 may traverse cells with TAI 1 and TAI 2 serviced by network 920, cells with TAI 4 and TAI 5 serviced by network 930, and cells with TAI 8 and TAI 11 serviced by network 940. Furthermore, planned flight path 910 may cross area 950. Area 950 may be associated with a high collision risk and UAV 110 may be instructed to activate a collision avoidance application while in area 950.

FIG. 10 illustrates a set 1000 of tables generated by NWDAFs 268 of networks associated with planned flight path 910. USS 810 may provide information relating to planned flight path 910 to a first NWDAF 268 in network 920, to a second NWDAF 268 in network 930, and to a third NWAF 268 in network 940. NWDAF tables 1001, 1002, and 1003 may include a time slot field 1010, a location field 1020, an application field 1030, a network slice field 1040, a PLMN ID field 1050, an eSIM profile field 1060, a network change field 1070, and a roaming field 1080.

Time slot field 1010 may include entries identifying particular time slots during planned flight path 910. Location field 1020 may include information identifying a predicted TAI for a time slot. Application field 1030 may include information identifying an application to be used by UAV 110 during the time slot. Network slice field 1040 may include information identifying a selected network slice for the time slot based on the location predicted for the time slot and the application to be used by UAV 110 during the time slot. PLMN ID field 1050 may store a PLMN ID for a network servicing the location predicted for the time slot. eSIM profile field 1060 may store an eSIM profile ID for UAV 110 for the PLMN ID. Network change field 1070 may store information identifying whether there is a change in the network from a previous time slot to the current time slot. Roaming field 1080 may store information identifying whether roaming, between different networks managed by the same provider, is required during the time slot.

NWDAF table 1001 may be generated by NWDAF 268 associated with network 920. As shown in NWDAF table 1001, UAV 110 is to use a private flight monitoring application in a private mIoT network slice associated with network 920 and eSIM profile 1 while in TAI 1 and TAI 2. When UAV 110 enter TAI 4, UAV 110 is to switch to eSIM profile 2, associated with PLMN 2 for network 930. Furthermore, UAV 110 is to switch from a private flight monitoring application to a default flight monitoring application associated with mIoT network slice for public network 930.

NWDAF table 1002 may be generated by NWAF 268 associated with network 930. As shown in NWDAF table 1002, UAV 110 is to use the default flight monitoring application in TAI 4. When UAV 110 enter TAI 5, associated with area 950, UAV 110 is to activate a collision detection application and switch to a URLLC network slice, because the collision detection application requires low latency. UAV 110 is to use the collision detection application in TAI 8, but to switch to eSIM profile 3, associated with PLMN ID 3 for network 940. Additionally, UAV 110 is to activate roaming while connected to network 940, because network 940 is not on the list of home networks for UAV 110. NWDAF table 1003 may be generated by NWAF 268 associated with network 940. As shown in NWDAF table 1003, UAV 110 is to continue to use the collision detection application while in TAI 8 and to switch to another private flight monitoring application associated with network 940.

FIG. 11 illustrates a set 1100 of tables associated with AMFs 220 of networks associated with flight path 900. AMF tables 1101, 1102, and 1103 may include a time slot field 1010, a location field 1120, a subscribed slices field 1130, an allowed slices field 1140, a selected slice field 1150, a slice updates field 1160, a slice change field 1170, a PLMN change field 1180, a roaming field 1190, and an eSIM profile field 1195.

Time slot field 1110 may include entries identifying particular time slots during planned flight path 910. Location field 1120 may include information identifying a predicted TAI for a time slot. Subscribed slices field 1130 may store information identifying network slices to which UAV 110 has subscribed. AMF 220 may obtain the subscribed network slices information from UDM 252. Allowed slices field 1140 may store information identifying network slices that are allowed in the TAI during the time slot. AMF 220 may obtain the allowed network slices information from NSSF 262. Selected slice field 1150 may store information identifying the network slice selected for UAV 110 to use during the time slot by NWDAF 268. Slice updates field 1160 store information identifying whether any network slices were updated for the time slot. For example, AMF 220 may request that NSSF 262 enable a slice for UAV 110 for the time slot. Slice change field 1170 may store information identifying whether the network slice to be used by UAV 110 has changed from the network slice used during the previous time slot. PLMN change field 1180 may store information identifying whether there is a change in the PLMN from a previous time slot to the time slot. Roaming field 1190 may store information identifying whether roaming, between different networks managed by the same provider, is required during the time slot. eSIM profile field 1195 may store an eSIM profile ID to be used by UAV 110 during the time slot.

AMF tables 1101, 1102, and 1103 may include S-NSSAI IDs for different network slices. Assume S-NSSAI-A1 identifies mIoT network slice in public network 930, S-NSSAI-A2 identifies the private mIoT network slice in network 920, S-NSSAI-A3 identifies the URLLC network slice in public network 930 and in network 940, and S-NSSAI-A4

AMF 220 associated with network 920 may obtain NWDAF table 1001 and use NWDAF table 1001 to generate AMF table 1101. AMF 220 may use AMF table 1101 to send instructions to UAV 110 via AF 250 associated with network 920. As shown in AMF table 1101, UAV 110 is to use network slice S-NSSAI-A2 in network 920 and eSIM profile 1 while in TAI 1 and TAI 2. When UAV 110 enter TAI 4, UAV 110 is to switch to eSIM profile 2 and network slice S-NSSAI-A1.

AMF 220 associated with network 930 may obtain NWDAF table 1002 and use NWDAF table 1002 to generate AMF table 1102. AMF 220 may use AMF table 1102 to send instructions to UAV 110 via AF 250 associated with network 930. As shown in AMF table 1102, UAV 110 is to use network slice S-NSSAI-A1 and eSIM profile 2 in TAI 4, network slice S-NSSAI-A3 and eSIM profile 2 in TAI 5, and network slice S-NSSAI-A3 and eSIM profile 3 in TAI 8. Additionally, UAV 110 is to activate roaming in TAI 8.

AMF 220 associated with network 940 may obtain NWDAF table 1003 and use NWDAF table 1003 to generate AMF table 1103. AMF 220 may use AMF table 1103 to send instructions to UAV 110 via AF 250 associated with network 940. As shown in AMF table 1103, UAV 110 is to use network slice S-NSSAI-A3 and eSIM profile 3 while in TAI 8 and S-NSSAI-A4 and eSIM profile 3 while in TAI 11. Additionally, UAV 110 is to keep roaming activated in TAI 8 and 11. Furthermore, since S-NSSAI-A4 is not on the allowed network slice list for TAI 11, AMF 220 may send a request to NSSF 262 to activate S-NSSAI-A4 as shown in slice updates field 1160.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 7, and a series of signals have been described with respect to FIG. 8, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:

receiving, by at least one device, information relating to a planned flight path of an unmanned aerial vehicle (UAV), wherein the planned flight path crosses areas serviced by a plurality of radio access networks;

generating, by the at least one device, a plurality of time slot predictions, wherein a time slot prediction, of the plurality of time slot predictions, specifies a time slot, a network slice, and a subscriber profile identifier;

generating, by the at least one device, a set of instructions based on the plurality of time slot predictions; and providing, by the at least one device, the generated set of instructions to the UAV, wherein the instructions cause the UAV to select a particular network slice and a particular subscriber profile during a particular time slot of the flight path.

2. The method of claim 1, wherein the information relating to the planned flight path includes, for a particular time slot, a predicted location for the particular time slot, a network identifier associated with the predicted location, and an application to be used by the UAV during the particular time slot.

3. The method of claim 1, wherein the planned flight path crosses an area serviced by a private network, and wherein the generated set of instructions instruct the UAV to activate an embedded Subscriber Identity Module (eSIM) profile associated with the private network when the UAV enters the area serviced by the private network.

4. The method of claim 1, wherein generating the set of instructions includes:

selecting an embedded Subscriber Identity Module (eSIM) profile for the UAV for a time slot based on a Public Land Mobile Network (PLMN) identifier associated with the time slot.

5. The method of claim 1, wherein generating the set of instructions includes:

selecting a network slice for the UAV for a time slot of the planned flight path based on an application to be used by the UAV during the time slot and based on historical performance data for the application at a location associated with the time slot during the planned flight path.

6. The method of claim 1, wherein generating the set of instructions includes:

determining whether roaming is required during a time slot of the planned flight path; and activating roaming for the UAV for the time slot.

7. The method of claim 1, wherein the time slot prediction further specifies a location associated with the time slot, a Public Land Mobile Network (PLMN) identifier associated with the time slot, whether there is a predicted change in a network during the time slot, and whether roaming is required during the time slot.

8. The method of claim 1, wherein generating the plurality of time slot predictions is performed by a Network Data Analytics Function (NWDAF).

9. The method of claim 1, wherein generating the set of instructions based on the plurality of time slot predictions is performed by an Access and Mobility Function (AMF).

10. The method of claim 1, wherein providing the generated set of instructions to the UAV is performed by an Application Function (AF).

11. One or more devices comprising:

one or more processors configured to:

receive information relating to a planned flight path of an unmanned aerial vehicle (UAV), wherein the planned flight path crosses areas serviced by a plurality of radio access networks;

generate a plurality of time slot predictions, wherein a time slot prediction, of the plurality of time slot predictions, specifies a time slot, a network slice, and a subscriber profile identifier;

generate a set of instructions based on the plurality of time slot predictions; and provide the generated set of instructions to the UAV, wherein the instructions cause the UAV to select a particular network slice and a particular subscriber profile during a particular time slot of the flight path.

12. The one or more devices of claim 11, wherein the information relating to the planned flight path includes, for a particular time slot, a predicted location for the particular time slot, a network identifier associated with the predicted location, and an application to be used by the UAV during the particular time slot.

13. The one or more devices of claim 11, wherein the planned flight path crosses an area serviced by a private network, and wherein the generated set of instructions instruct the UAV to activate an embedded Subscriber Identity Module (eSIM) profile associated with the private network when the UAV enters the area serviced by the private network.

14. The one or more devices of claim 11, wherein, when generating the set of instructions, the one or more processors are further configured to:

select an embedded Subscriber Identity Module (eSIM) profile for the UAV for a time slot based on a Public Land Mobile Network (PLMN) identifier associated with the time slot.

15. The one or more devices of claim 11, wherein, when generating the set of instructions, the one or more processors are further configured to:

select a network slice for the UAV for a time slot of the planned flight path based on an application to be used by the UAV during the time slot and based on historical performance data for the application at a location associated with the time slot during the planned flight path.

16. The one or more devices of claim 11, wherein, when generating the set of instructions, the one or more processors are further configured to:

determine whether roaming is required during a time slot of the planned flight path; and activate roaming for the UAV for the time slot.

17. The one or more devices of claim 11, wherein the time slot prediction further specifies a location associated with the time slot, a Public Land Mobile Network (PLMN) identifier associated with the time slot, whether there is a predicted change in a network during the time slot, and whether roaming is required during the time slot.

18. The one or more devices of claim 11, wherein the one or more processors are associated with a Network Data Analytics Function (NWDAF), wherein NWDAF is configured to generate the plurality of time slot predictions.

19. The one or more devices of claim 11, wherein the one or more processors are associated with an Access and Mobility Function (AMF) configured to generate the set of instructions based on the plurality of time slot predictions, and an Application Function (AF) configured to provide the generated set of instructions to the UAV.

20. A system comprising:

a Network Data Analytics Function (NWDAF) device configured to:

receive information relating to a planned flight path of an unmanned aerial vehicle (UAV), wherein the planned flight path crosses areas serviced by a plurality of radio access networks; and generate a plurality of time slot predictions, wherein a time slot prediction, of the plurality of time slot predictions, prediction specifies a time slot, a network slice, and a subscriber profile identifier;

an Access and Mobility Function (AMF) device configured to:

generate a set of instructions based on the plurality of time slot predictions; and an Application Function (AF) device configured to:

provide the generated set of instructions to the UAV, wherein the instructions cause the UAV to select a particular network slice and a particular subscriber profile during a particular time slot of the flight path.

* * * * *